United States Patent
Bearden

(10) Patent No.: US 7,493,450 B2
(45) Date of Patent: Feb. 17, 2009

(54) METHOD OF TRIGGERING READ CACHE PRE-FETCH TO INCREASE HOST READ THROUGHPUT

(75) Inventor: Brian S. Bearden, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 10/414,194

(22) Filed: Apr. 14, 2003

(65) Prior Publication Data

US 2004/0205299 A1 Oct. 14, 2004

(51) Int. Cl.
*G06F 12/00* (2006.01)

(52) U.S. Cl. ............... 711/137; 711/113; 711/122; 711/204; 711/213; 711/217; 711/218

(58) Field of Classification Search ........... 711/137, 711/113, 122, 204, 213, 217–218
See application file for complete search history.

(56) References Cited

U.S. PATENT DOCUMENTS

| | | | | |
|---|---|---|---|---|
| 6,606,688 | B1 * | 8/2003 | Koyanagi et al. | 711/137 |
| 6,633,957 | B2 * | 10/2003 | Bates et al. | 711/137 |
| 6,816,946 | B2 * | 11/2004 | Magoshi | 711/137 |
| 2002/0087801 | A1 * | 7/2002 | Bogin et al. | 711/137 |
| 2004/0003179 | A1 * | 1/2004 | Shirahige et al. | 711/137 |

OTHER PUBLICATIONS

Adams, April; "IBM Enterprise Storage Server Models F10/F20"; ZDNet; Jan. 7, 2002; 5 pages; http://techupdate.zdnet.com/techupdate/stories/main/0,14179,2836789,00.html.
Revel, Dan; McNamee, Dylan; Pu, Calton; Steere, David; Walpole, Jonathan; "Feedback-based Dynamic Proportion Allocation for Disk I/O"; Department of Computer Science and Engineering, Oregon Graduate Institute of Science and Technology; Dec. 7, 1998; 5 pages.
Suh, G.E.; Rudolph, Larry; Devadas, Srinivas; "Dynamic Partitioning of Shared Cache Memory"; Klumer Academic Publisher, Netherlands; 2002; 23 pages.
Grimsrud, Knut Stener; Archibald, James K.; Nelson, Brent E; "Multiple Prefetch Adaptive Disk Caching"; IEEE Transaction on Knowledge and Data Engineering, vol. 5, Feb. 1993; pp. 88-103.
Suh, G. E.; Rudolph, Larry; Devadas, Srinivas; "Dynamic Cache Partitioning for Simultaneous Mutithreading Systems"; Proceedings of the IASTED International Conference on Parallel and Distributed Computing and Systems (PDCS2001); Aug. 2001; 7 pages.

* cited by examiner

*Primary Examiner*—Jasmine Song

(57) ABSTRACT

Exemplary systems and methods include pre-fetching data in response to a read cache hit. Various exemplary methods include priming a read cache with initial data, and triggering a read pre-fetch operation in response to a read cache hit upon the initial data in the read cache. Another exemplary implementation includes a storage device having a read cache and a trigger module that causes a pre-fetch of data from a mass storage medium in response to a read cache hit upon data in the read cache.

42 Claims, 9 Drawing Sheets

METHOD OF TRIGGERING READ CACHE PRE-FETCH TO INCREASE HOST READ THROUGHPUT

CROSS REFERENCE TO RELATED APPLICATIONS

The present application contains subject matter related to the following co-pending applications: "Method of Cache Collision Avoidance in the Presence of a Periodic Cache Aging Algorithm," Ser. No. 10/414,180 identified by HP; "Method of Adaptive Read Cache Pre-Fetching to Increase Host Read Throughput," Ser. No. 10/414,189 identified by HP; "Method of Adaptive Cache Partitioning to Increase Host I/O Performance, identified by HP; Ser. No. 10/414,188 and "Method of Detecting Sequential Workloads to Increase Host Read Throughput," Ser. No. 10/414,195 identified by HP. The foregoing applications are incorporated by reference herein, assigned to the same assignee as this application and filed on even date herewith.

TECHNICAL FIELD

The present disclosure relates to data storage, and more particularly, to triggering a read cache pre-fetch.

BACKGROUND

Computer data storage devices, such as disk drives and Redundant Array of Independent Disks (RAID), typically use a cache memory in combination with mass storage media (e.g., magnetic tape or disk) to save and retrieve data in response to requests from a host device. Cache memory, often referred to simply as "cache", offers improved performance over implementations without cache. Cache typically includes one or more integrated circuit memory device(s), which provide a very high data rate in comparison to the data rate of non-cache mass storage medium. Due to unit cost and space considerations, cache memory is usually limited to a relatively small fraction of (e.g., 256 kilobytes in a single disk drive) mass storage medium capacity (e.g., 256 Gigabytes). As a result, the limited cache memory should be used as efficiently and effectively as possible.

Cache is typically used to temporarily store data prior to transferring the data to an ultimate destination. For example, a read cache is often used to temporarily store data that is destined for the host device. In addition, a write cache is typically used to temporarily store data from the host device that is destined for the mass storage medium. Thus, cache is typically divided into a read cache portion and a write cache portion. Data in cache is typically processed on a page basis. The size of a page is generally fixed in any particular implementation; a typical page size is 64 kilobytes.

Generally, storage device performance improves as read cache hit rate goes up. A read cache hit is an event in which requested data is available in the read cache to satisfy the request. Read cache hit rate is a measure of frequency of accessing the read cache rather than another type of memory, such as mass media (e.g., a disk). As is generally understood, the mass media typically takes much longer to access than the read cache. Thus, by increasing the read cache hit rate, data input/output (I/O) rate to the host can be increased. In order to take advantage of the relatively faster read cache, typical storage devices attempt to predict what data a host device will request in the near future and pre-fetch that data; that is, read the data from the mass media and store the data in the read cache so that that data is available in the read cache when the host actually requests it. Pre-fetching has been found to increase the likelihood of a read cache hit.

One way to decide whether to pre-fetch data is by identifying "sequential workloads" during operation. A sequential workload is generally a host workload that includes request(s) for data at logical addresses that are substantially sequential. After detecting a sequential workload, the storage device can pre-fetch data in the detected sequence and store that data in the read cache. In a traditional system, after data is pre-fetched, the system must continue to attempt to detect sequential workloads, prior to performing subsequent pre-fetches. Thus, any benefits that might be gained as a result of subsequent pre-fetches typically are contingent upon detecting subsequent sequential workloads.

Unfortunately, detecting sequential workloads can be time and resource consuming. A typical process for detecting a sequential workload involves storing a number of host requests in memory, sorting addresses associated with the stored host requests, often in numerical order, and then attempting to identify a sequential pattern in the sorted addresses. Identifying a sequential pattern often involves use of a resource-expensive sequential pattern recognition algorithm based on sorted addresses. The memory required to separately store host requests, and the processor time and memory required to sort and identify pattern(s) in the request addresses can result in inefficient use of storage device resources. Any resource (e.g., memory or processor time) that is used to detect a sequential workload, therefore, may not be available for host I/O.

Unfortunately, the sequential workload detection process is typically repeatedly executed in a storage device as host read requests arrive prior to pre-fetching data. As a result, the inefficiencies of the sequential detection process discussed above are often compounded when determining whether to pre-fetch data. Thus, traditional methods of determining when to pre-fetch data typically utilize storage device resources inefficiently.

SUMMARY

It is with respect to the foregoing and other considerations, that various exemplary systems, devices and/or methods have been developed and are presented herein.

One exemplary implementation includes a method of pre-fetching data in response to a read cache hit. This method may include priming a read cache with initial data, and triggering a read pre-fetch operation in response to a read cache hit upon the initial data in the read cache.

Another exemplary implementation includes a storage device having a read cache and a trigger module that causes a pre-fetch of data from a mass storage medium in response to a read cache hit upon data in the read cache.

DETAILED DESCRIPTION

Various exemplary systems, devices and methods are described herein, which employ a module(s) for triggering a pre-fetch operation. Generally, one or more module(s) employ operations to trigger a pre-fetch operation based on a read cache hit. More specifically, a read cache may be primed or initialized with data and a subsequent cache hit upon the cached data may cause a read pre-fetch operation. Still more specifically, a sequential workload may trigger a pre-fetch that primes the read cache. More specifically still, a read cache hit upon pre-fetched data may trigger yet another pre-fetch operation. More specifically still, the amount of data that is pre-fetched may be more or less than a page and may depend on a type of sequential workload.

Figure 1:
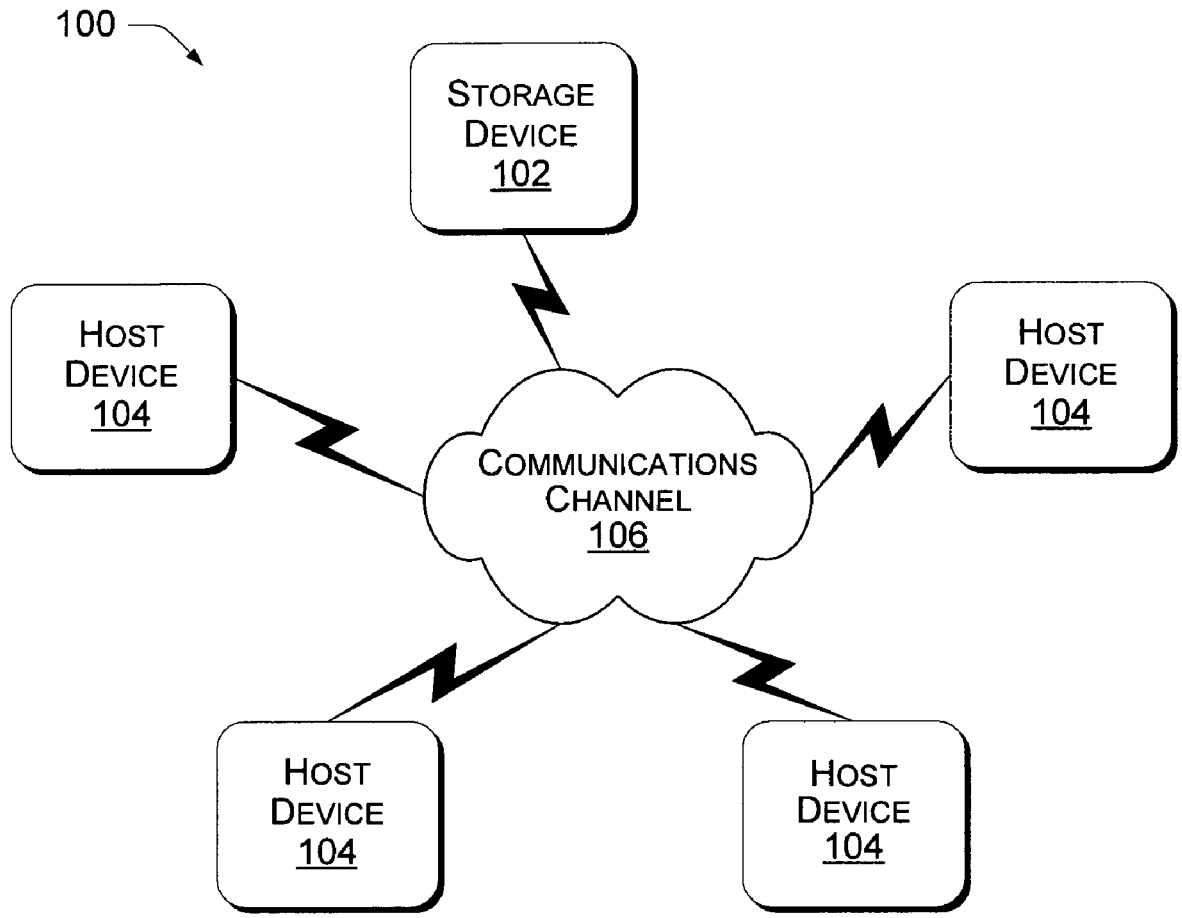
FIG. 1 illustrates a system environment that is suitable for managing read cache pre-fetches in a storage device to facilitate maximization of the likelihood of a read cache hit.

FIG. 1 illustrates a suitable system environment 100 for triggering a pre-fetch in response to and/or in preparation for a workload arising from one or more host devices 104. The storage device 102 may utilize cache memory in responding to request(s) from the one or more host devices 104. Efficient triggering of read pre-fetches facilitates effective usage of cache memory in the storage device 102. As used herein, the terms "read pre-fetch," "read cache pre-fetch," and pre-fetch may be used interchangeably and all refer to a pre-fetch. By pre-fetching data related to a host workload, storage performance goals are more likely achieved than if data is not pre-fetched.

Storage performance goals may include mass storage, low cost per stored megabyte, high input/output performance, and high data availability through redundancy and fault tolerance. The storage device 102 may be an individual storage system, such as a single hard disk drive, or the storage device 102 may be an arrayed storage system having more than one storage system or device. Thus, the storage devices 102 can include one or more storage components or devices operatively coupled within the storage device 102, such as magnetic disk drives, tape drives, optical read/write disk drives, solid state disks and the like.

The system environment 100 of FIG. 1 includes a storage device 102 operatively coupled to one or more host device(s) 104 through a communications channel 106. The communications channel 106 can be wired or wireless and can include, for example, a LAN (local area network), a WAN (wide area network), an intranet, the Internet, an extranet, a fiber optic cable link, a direct connection, or any other suitable communication link. Host device(s) 104 can be implemented as a variety of general purpose computing devices including, for example, a personal computer (PC), a laptop computer, a server, a Web server, and other devices configured to communicate with the storage device 102.

In one implementation, the host 104 transmits requests to the storage device 102 to store and/or retrieve data on and from the storage device 102. One type of request the host 104 may make is a read request to read data from the storage device 102. The read request may indicate an address from which to retrieve data in the storage device 102. In one implementation, the host address is in the form of a logical block address (LBA). The host address may also include a logical unit (LUN), indicating a particular storage unit in the storage device. Other forms of host addresses may be employed.

Whatever the form of the host address, the storage device 102 receives the read request and uses the host address to retrieve the requested data from a mass storage media (such as a disk or tape) or a cache memory. The storage device 102 may parse the read request into various component parts, such as the address and the amount of data requested. In one implementation, the storage device then determines whether the requested data is in the cache memory, and if so, retrieves the requested data from the cache memory; however, if the requested data is not in the cache memory, the storage device 102 retrieves the data from the mass storage media. In a particular disk drive implementation, retrieving the data from the disk(s) involves mapping the given host address (such as LBA/LUN) to another form, such as Physical Cylinder/Head/Sector (PCHS) where the requested data actually resides.

Various exemplary systems and/or methods disclosed herein may apply to various types of storage devices 102 that employ a range of storage components as generally discussed above. In addition, storage devices 102 as disclosed herein may be virtual storage array devices that include a virtual memory storage feature. Thus, the storage devices 102 presently disclosed may provide a layer of address mapping indirection between host 104 addresses and the actual physical addresses where host 104 data is stored within the storage device 102. Address mapping indirection may use pointers or other dereferencing, which make it possible to move data around to different physical locations within the storage device 102 in a way that is transparent to the host 104.

As an example, a host device 104 may store data at host address $H_5$, which the host 104 may assume is pointing to the physical location of sector #56 on disk #2 on the storage device 102. However, the storage device 102 may move the host data to an entirely different physical location (e.g., disk #9, sector #27) within the storage device 102 and update a pointer (i.e., layer of address indirection) so that it always points to the host data. The host 104 may continue accessing the data using the same host address $H_5$, without having to know that the data has actually resides at a different physical location within the storage device 102.

In addition, the storage device 102 may utilize cache memory to facilitate rapid execution of read and write operations. When the host device 104 accesses data using a host address (e.g., $H_5$), the storage device may access the data in cache, rather than on mass storage media (e.g., disk or tape). Thus, the host 104 is not necessarily aware that data read from the storage device 102 may actually come from a read cache or data sent to the storage device 102 may actually be stored temporarily in a write cache. When data is stored temporarily in write cache, the storage device 102 may notify the host device 104 that the data has been saved, and later de-stage, or write the data from the write cache onto mass storage media.

Figure 2:
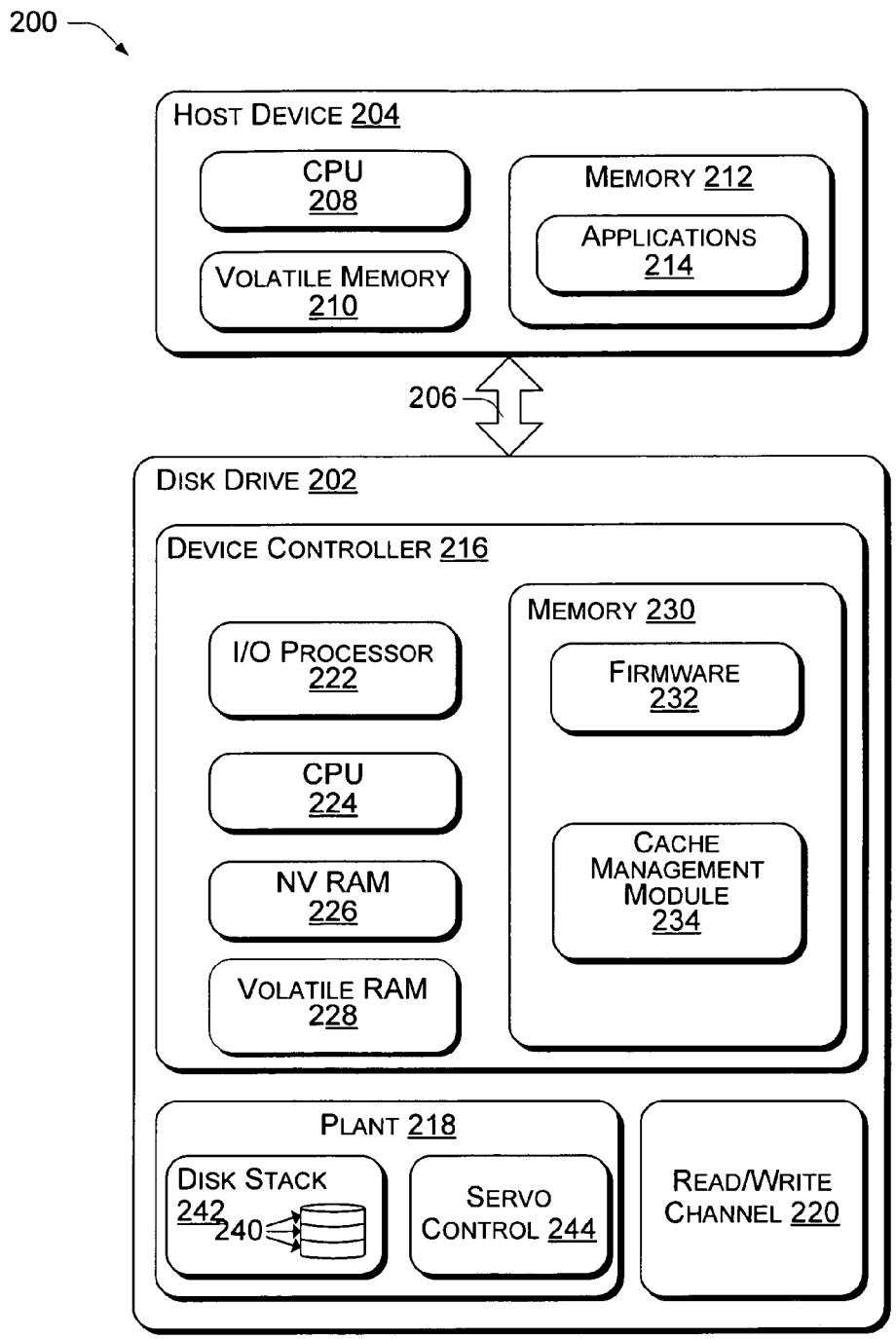
FIG. 2 is a block diagram illustrating in greater detail, a particular implementation of a host computer device and a storage device as might be implemented in the system environment of FIG. 1.

FIG. 2 is a functional block diagram illustrating a particular implementation of a host computer device 204 and a storage device 202 as might be implemented in the system environment 100 of FIG. 1. The storage device 202 of FIG. 2 is embodied as a disk drive. While the methods and systems for detecting sequential workloads are discussed in FIG. 2 with respect to a disk drive implementation, it will be understood by one skilled in the art that the methods and systems may be applied to other types of storage devices, such as tape drives, CD-ROM, and others.

The host device 204 is embodied generally as a computer such as a personal computer (PC), a laptop computer, a server, a Web server, or other computer device configured to communicate with the storage device 202. The host device 204 typically includes a processor 208, a volatile memory 210 (i.e., RAM), and a nonvolatile memory 212 (e.g., ROM, hard disk, floppy disk, CD-ROM, etc.). Nonvolatile memory 212 generally provides storage of computer readable instructions, data structures, program modules and other data for the host device 204. The host device 204 may implement various application programs 214 stored in memory 212 and executed on the processor 208 that create or otherwise access data to be transferred via a communications channel 206 to the disk drive 202 for storage and subsequent retrieval.

Such applications 214 might include software programs implementing, for example, word processors, spread sheets, browsers, multimedia players, illustrators, computer-aided design tools and the like. Thus, host device 204 provides a regular flow of data I/O requests to be serviced by the disk drive 202. The communications channel 206 may be any bus structure/protocol operable to support communications between a computer and a disk drive, including, Small Computer System Interface (SCSI), Extended Industry Standard Architecture (EISA), Peripheral Component Interconnect (PCI), Attachment Packet Interface (ATAPI), and the like.

The disk drive 202 is generally designed to provide data storage and data retrieval for computer devices such as the host device 204. The disk drive 202 may include a controller 216 that permits access to the disk drive 202. The controller 216 on the disk drive 202 is generally configured to interface with a disk drive plant 218 and a read/write channel 220 to access data on one or more disk(s) 240. Thus, the controller 216 performs tasks such as attaching validation tags (e.g., error correction codes (ECC)) to data before saving it to disk(s) 240 and checking the tags to ensure data from a disk(s) 240 is correct before sending it back to host device 104. The controller 216 may also employ error correction that involves recreating data that may otherwise be lost during failures.

The plant 218 is used herein to include a servo control module 244 and a disk stack 242. The disk stack 242 includes one or more disks 240 mounted on a spindle (not shown) that is rotated by a motor (not shown). An actuator arm (not shown) extends over and under top and bottom surfaces of the disk(s) 240, and carries read and write transducer heads (not shown), which are operable to read and write data from and to substantially concentric tracks (not shown) on the surfaces of the disk(s) 240.

The servo control module 244 is configured to generate signals that are communicated to a voice coil motor (VCM) that can rotate the actuator arm, thereby positioning the transducer heads over and under the disk surfaces. The servo control module 244 is generally part of a feedback control loop that substantially continuously monitors positioning of read/write transducer heads and adjusts the position as necessary. As such, the servo control module 244 typically includes filters and/or amplifiers operable to condition positioning and servo control signals. The servo control module 244 may be implemented in any combination of hardware, firmware, or software.

The definition of a disk drive plant can vary somewhat across the industry. Other implementations may include more or fewer modules in the plant 218; however, the general purpose of the plant 218 is to provide the control to the disk(s) 240 and read/write transducer positioning, such that data is accessed at the correct locations on the disk(s). The read/write channel 220 generally communicates data between the device controller 216 and the transducer heads (not shown). The read/write channel may have one or more signal amplifiers that amplify and/or condition data signals communicated to and from the device controller 216.

Generally, accessing the disk(s) 240 is a relatively time-consuming task in the disk drive 202. The time-consuming nature of accessing (i.e., reading and writing) the disk(s) 240 is at least partly due to the electromechanical processes of positioning the disk(s) 240 and positioning the actuator arm. Time latencies that are characteristic of accessing the disk(s) 240 are more or less exhibited by other types of mass storage devices that access mass storage media, such as tape drives, optical storage devices, and the like.

As a result, mass storage devices, such as the disk drive 202, may employ cache memory to facilitate rapid data I/O responses to the host 204. Cache memory, discussed in more detail below, may be used to store pre-fetched data from the disk(s) 240 that will most likely be requested in the near future by the host 204. Cache may also be used to temporarily store data that the host 204 requests to be stored on the disk(s) 240.

The controller 216 on the storage device 202 typically includes I/O processor(s) 222, main processor(s) 224, volatile RAM 228, nonvolatile (NV) RAM 226, and nonvolatile memory 230 (e.g., ROM, flash memory). Volatile RAM 228 provides storage for variables during operation, and may store read cache data that has been pre-fetched from mass storage. NV RAM 226 may be supported by a battery backup (not shown) that preserves data in NV RAM 226 in the event power is lost to controller(s) 216. As such, NV RAM 226 generally stores data that should be maintained in the event of power loss, such as write cache data. Nonvolatile memory 230 may provide storage of computer readable instructions, data structures, program modules and other data for the storage device 202.

Accordingly, the nonvolatile memory 230 includes firmware 232 and an address analysis module 234 that analyzes memory addresses associated with data that may be stored in read cache in the NV RAM 226 and/or the volatile RAM 228. Firmware 232 is generally configured to execute on the processor(s) 224 and support normal storage device 202 operations. Firmware 232 may also be configured to handle various fault scenarios that may arise in the disk drive 202. In the implementation of FIG. 2, the address analysis module 234 is configured to execute on the processor(s) 224 to analyze host addresses and related addresses as they might correspond to data in the read cache and/or the mass storage media, as more fully discussed herein below.

The I/O processor(s) 222 receives data and commands from the host device 204 via the communications channel 206. The I/O processor(s) 222 communicate with the main processor(s) 224 through standard protocols and interrupt procedures to transfer data and commands between NV RAM 226 and the read/write channel 220 for storage of data on the disk(s) 240.

As indicated above, the implementation of a storage device 202 as illustrated by the disk drive 202 in FIG. 2, includes an address analysis module 234 and cache memory. The address analysis module 234 is configured to perform several tasks during the normal operation of storage device 202. One of the tasks that the address analysis module 234 may perform is that of generating addresses that are related to addresses accessed by the host 204. The address analysis module 234 may cause a read pre-fetch operation if data in the read cache corresponds to the related addresses. The address analysis module 234 may map host requests to cache indices that reference locations in the read cache.

Read cache pre-fetching generally includes fetching data from a mass storage media, such as one or more disk(s), before a host requests the data. The pre-fetched data may be stored in a cache memory to facilitate rapid output when the host requests the data. The pre-fetched data may be fetched, stored, and retrieved on a page-by-page basis. The size of a page may be any amount of data suitable for a particular implementation. Pre-fetching may also include updating an index table (such as a hash table) that relates host addresses to data that resides in the cache. Read cache pre-fetching may be carried out by executable code, executing a pre-fetching process on the CPU 224.

Figure 3:
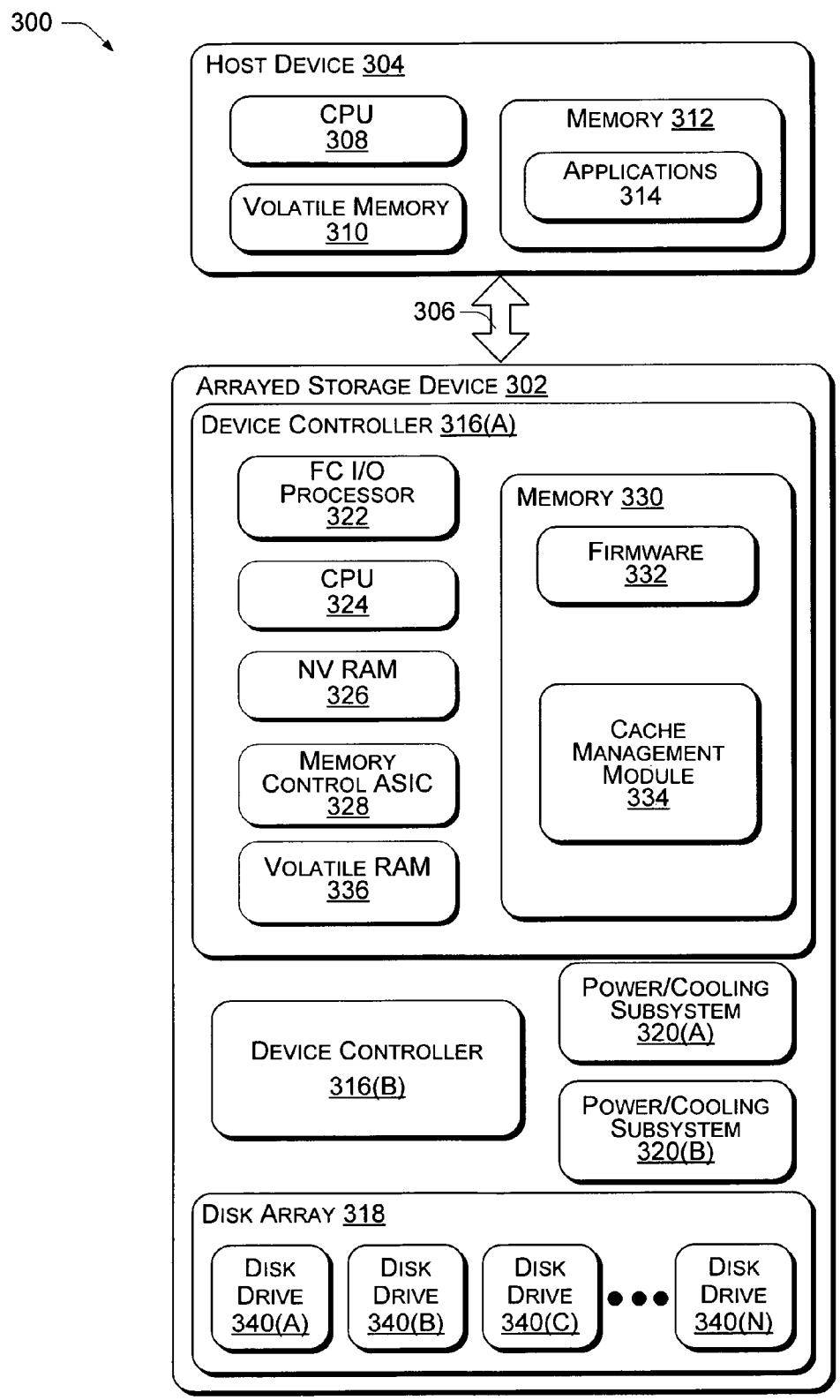
FIG. 3 is a block diagram illustrating in greater detail, another implementation of a host computer device and a storage device as might be implemented in the system environment of FIG. 1.

FIG. 2 illustrates an implementation involving a single disk drive 202. An alternative implementation may be a Redundant Array of Independent Disks (RAID), having an array of disk drives and more than one controller. As is discussed below, FIG. 3 illustrates an exemplary RAID implementation.

RAID systems are specific types of virtual storage arrays, and are known in the art. RAID systems are currently implemented, for example, hierarchically or in multi-level arrangements. Hierarchical RAID systems employ two or more different RAID levels that coexist on the same set of disks within an array. Generally, different RAID levels provide different benefits of performance versus storage efficiency.

For example, RAID level 1 provides low storage efficiency because disks are mirrored for data redundancy, while RAID level 5 provides higher storage efficiency by creating and storing parity information on one disk that provides redundancy for data stored on a number of disks. However, RAID level 1 provides faster performance under random data writes than RAID level 5 because RAID level 1 does not require the multiple read operations that are necessary in RAID level 5 for recreating parity information when data is being updated (i.e. written) to a disk.

Hierarchical RAID systems use virtual storage to facilitate the migration (i.e., relocation) of data between different RAID levels within a multi-level array in order to maximize the benefits of performance and storage efficiency that the different RAID levels offer. Therefore, data is migrated to and from a particular location on a disk in a hierarchical RAID array on the basis of which RAID level is operational at that location. In addition, hierarchical RAID systems determine which data to migrate between RAID levels based on which data in the array is the most recently or least recently written or updated data. Data that is written or updated least recently may be migrated to a lower performance, higher storage-efficient RAID level, while data that is written or updated the most recently may be migrated to a higher performance, lower storage-efficient RAID level.

In order to facilitate efficient data I/O, many RAID systems utilize read cache and write cache. The read and write cache of an arrayed storage device is generally analogous to the read and write cache of a disk drive discussed above. Caching in an arrayed storage device, may introduce another layer of caching in addition to the caching that may be performed by the underlying disk drives. In order to take full advantage of the benefits offered by an arrayed storage device, such as speed and redundancy, an address analysis system advantageously increases the likelihood of a read cache hit. The implementation discussed with respect to FIG. 3 includes an address analysis system for efficient detection of sequential host workloads based in part on contents of cache.

FIG. 3 is a functional block diagram illustrating a suitable environment 300 for an implementation including an arrayed storage device 302 in accordance with the system environment 100 of FIG. 1. "Arrayed storage device" 302 and its variations, such as "storage array device", "array", "virtual array" and the like, are used throughout this disclosure to refer to a plurality of storage components/devices being operatively coupled for the general purpose of increasing storage performance. The arrayed storage device 302 of FIG. 3 is embodied as a virtual RAID (redundant array of independent disks) device. A host device 304 is embodied generally as a computer such as a personal computer (PC), a laptop computer, a server, a Web server, a handheld device (e.g., a Personal Digital Assistant or cellular phone), or any other computer device that may be configured to communicate with RAID device 302.

The host device 304 typically includes a processor 308, a volatile memory 316 (i.e., RAM), and a nonvolatile memory 312 (e.g., ROM, hard disk, floppy disk, CD-ROM, etc.). Nonvolatile memory 312 generally provides storage of computer readable instructions, data structures, program modules and other data for host device 304. The host device 304 may implement various application programs 314 stored in memory 312 and executed on processor 308 that create or otherwise access data to be transferred via network connection 306 to the RAID device 302 for storage and subsequent retrieval.

The applications 314 might include software programs implementing, for example, word processors, spread sheets, browsers, multimedia players, illustrators, computer-aided design tools and the like. Thus, the host device 304 provides a regular flow of data I/O requests to be serviced by virtual RAID device 302.

RAID devices 302 are generally designed to provide continuous data storage and data retrieval for computer devices such as the host device(s) 304, and to do so regardless of various fault conditions that may occur. Thus, a RAID device 302 typically includes redundant subsystems such as controllers 316(A) and 316(B) and power and cooling subsystems 320(A) and 320(B) that permit continued access to the disk array 302 even during a failure of one of the subsystems. In addition, RAID device 302 typically provides hot-swapping capability for array components (i.e. the ability to remove and replace components while the disk array 318 remains online) such as controllers 316(A) and 316(B), power/cooling subsystems 320(A) and 320(B), and disk drives 340 in the disk array 318.

Controllers 316(A) and 316(B) on RAID device 302 mirror each other and are generally configured to redundantly store and access data on disk drives 340. Thus, controllers 316(A) and 316(B) perform tasks such as attaching validation tags to data before saving it to disk drives 340 and checking the tags to ensure data from a disk drive 340 is correct before sending it back to host device 304. Controllers 316(A) and 316(B) also tolerate faults such as disk drive 340 failures by recreating data that may be lost during such failures.

Controllers 316 on RAID device 302 typically include I/O processor(s) such as FC (fiber channel) I/O processor(s) 322, main processor(s) 324, volatile RAM 336, nonvolatile (NV) RAM 326, nonvolatile memory 330 (e.g., ROM, flash memory), and one or more application specific integrated circuits (ASICs), such as memory control ASIC 328. Volatile RAM 336 provides storage for variables during operation, and may store read cache data that has been pre-fetched from mass storage. NV RAM 326 is typically supported by a battery backup (not shown) that preserves data in NV RAM 326 in the event power is lost to controller(s) 316. NV RAM 326 generally stores data that should be maintained in the event of power loss, such as write cache data. Nonvolatile memory 330 generally provides storage of computer readable instructions, data structures, program modules and other data for RAID device 302.

Accordingly, nonvolatile memory 330 includes firmware 332 and an address analysis module 334 operable to analyze addresses corresponding to cache data in the NV RAM 326 and/or the volatile RAM 336. Firmware 332 is generally configured to execute on processor(s) 324 and support normal arrayed storage device 302 operations. In one implementation the firmware 332 includes array management algorithm(s) to make the internal complexity of the array 318 transparent to the host 304, map virtual disk block addresses to member disk block addresses so that I/O operations are properly targeted to physical storage, translate each I/O request to a virtual disk into one or more I/O requests to underlying member disk drives, and handle errors to meet data performance/reliability goals, including data regeneration, if necessary. In the implementation shown in FIG. 3, the address analysis module 334 is configured to execute on the processor(s) 324 and analyze host addresses to determine whether a sequential workload may be occurring based on the contents of read cache.

The FC I/O processor(s) 322 receives data and commands from host device 304 via the network connection 306. FC I/O processor(s) 322 communicate with the main processor(s) 324 through standard protocols and interrupt procedures to transfer data and commands to redundant controller 316(B) and generally move data between volatile RAM 336, NV RAM 326 and various disk drives 340 in the disk array 318 to ensure that data is stored redundantly. The arrayed storage device 302 includes one or more communications channels to the disk array 318, whereby data is communicated to and from the disk drives 340. The disk drives 340 may be arranged in any configuration as may be known in the art. Thus, any number of disk drives 340 in the disk array 318 can be grouped together to form disk systems.

The memory control ASIC 328 generally controls data storage and retrieval, data manipulation, redundancy management, and the like through communications between mirrored controllers 316(A) and 316(B). Memory controller ASIC 328 handles tagging of data sectors being striped to disk drives 340 in the array of disks 318 and writes parity information across the disk drives 340. In general, the functions performed by ASIC 328 might also be performed by firmware or software executing on general purpose microprocessors. Data striping and parity checking are well-known to those skilled in the art.

The memory control ASIC 328 also typically includes internal buffers (not shown) that facilitate testing of memory 330 to ensure that all regions of mirrored memory (i.e. between mirrored controllers 316(A) and 316(B)) are compared to be identical and checked for ECC (error checking and correction) errors on a regular basis. The memory control ASIC 328 notifies the processor 324 of these and other errors it detects. Firmware 332 is configured to manage errors detected by memory control ASIC 328 in a tolerant manner which may include, for example, preventing the corruption of array 302 data or working around a detected error/fault through a redundant subsystem to prevent the array 302 from crashing.

Figure 4:
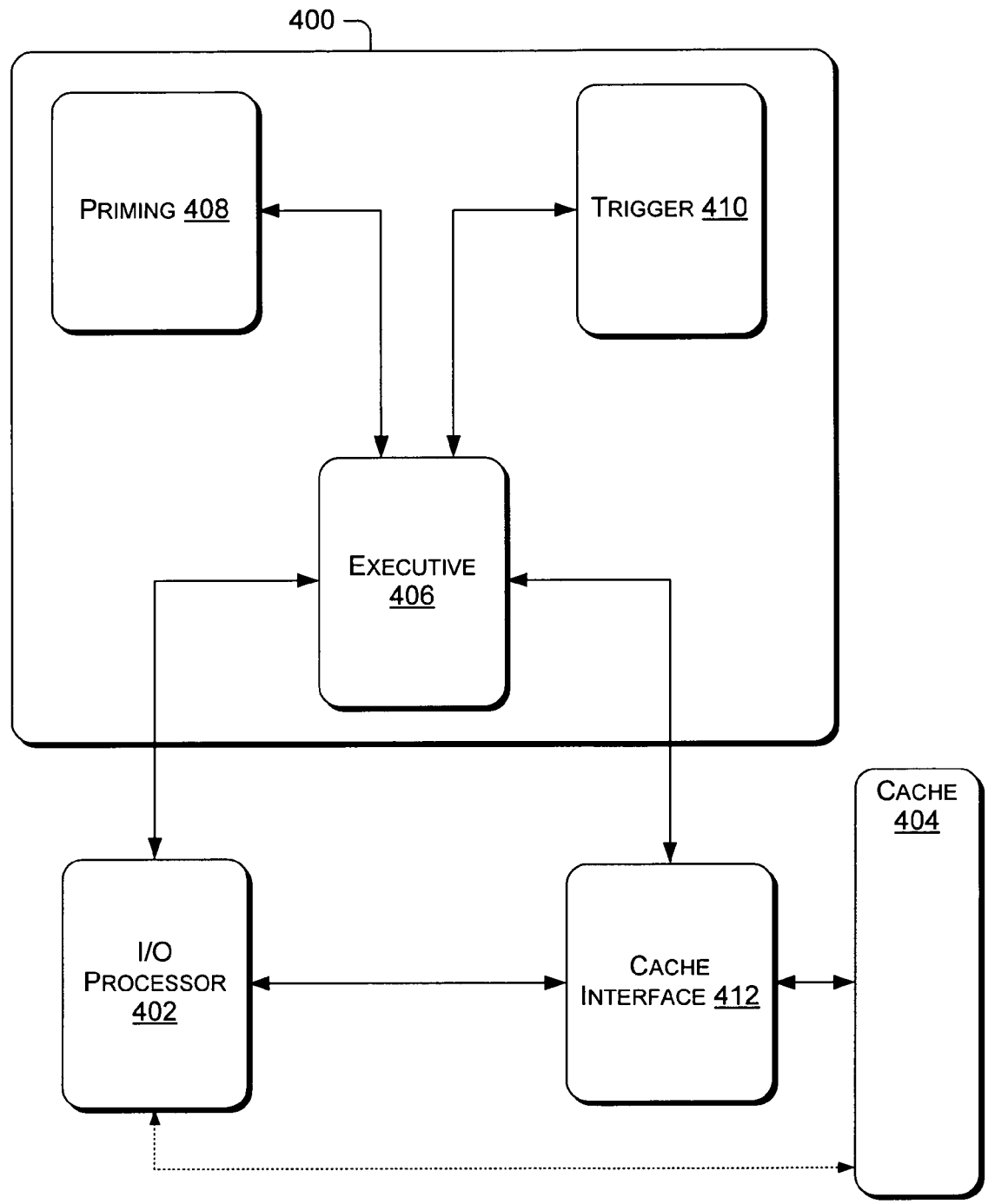
FIG. 4 illustrates an exemplary functional block diagram of a pre-fetch manager that may reside in the system environments of FIGS. 1-3, wherein an executive module interacts with a priming module, a trigger module, a cache interface, and an input/output processor to manage pre-fetching.

FIG. 4 illustrates an exemplary functional block diagram of a pre-fetch manager 400 in operable communication with an input/output (I/O) processor 402, a cache interface 412, and a read cache 404, which may reside in the system environments of FIGS. 1-3. The exemplary pre-fetch manager 400 includes an executive module 406 that interacts with a priming module 408, a trigger module 410, the cache interface 412, and the I/O processor 402 to manage pre-fetching in a computing system. In general, the priming module 408 may prime the read cache 404 with data and the trigger module 410 may initiate a read cache pre-fetch operation if a read cache hit is detected.

With regard to the I/O processor, in one implementation the I/O processor 402 receives host workload information, such as read requests, from a host device (for example, the host device 104, FIG. 1; host device 204, FIG. 2; host device 304, FIG. 3). The requests may contain memory addresses or some other identification of the data being requested. The I/O processor 402 may format the requests by, for example, parsing the requests into component parts, or otherwise.

In a particular implementation, the I/O processor 402 transfers the requests and/or the addresses to the executive module 406. The I/O processor 402 may also respond to requests from the executive module 406 to transfer data from cache and/or mass storage media (for example, the disk(s) 240, FIG. 2 or disk drive(s) 340, FIG. 3) to the host. Data transfer via the I/O processor 402 may be by direct memory access (DMA), or any other data transfer mechanism as may be known in the art.

Referring more specifically to the executive module 406, one implementation of the executive module 406 handles communication among the priming module 408, the trigger module 410, the cache interface 412, and the I/O processor 402. The executive module 406 may receive requests and/or memory addresses from the I/O processor 402. The executive module 406 may pass the requests and/or addresses to the priming module 408 and/or trigger module 410. Based on the requests or addresses, and as is discussed in more detail below, the priming module 408 may initiate a priming operation to prime the cache 404 with initial data, and the trigger module 410 may determine that data should be pre-fetched into the cache 404 based on a read cache hit.

The executive module 406 may monitor various states or conditions of the system. As discussed in more detail below, one exemplary state (unprimed state) is characterized by the cache 404 being unprimed or uninitialized. In the unprimed state, the cache 404 may have no data or no valid data available for a read cache hit. Another exemplary state (primed state) is characterized by the cache 404 having valid data. In the primed state, data in the read cache 404 is available to satisfy a read request, and a read cache hit may occur. The executive module 402 may keep track of the various states using a flag, or other data structure. The executive module 402 may determine and/or change the state of the system based on trigger events communicated from the priming module 408, the trigger module 410, the I/O processor 402, and the cache interface 412.

For example, when the system initially starts up, the cache 404 typically does not contain valid data available for a read cache hit. Thus, the executive module 404 may initialize a state flag to indicate the unprimed state. After one or more host read requests arrive to the system, the priming module 408 may notify the executive module 406 that a condition, such as a sequential workload, has been detected that warrants priming of the cache 404. In a particular implementation, the executive module 406 instructs the cache interface 412 to initiate a pre-fetch in response to detection of the sequential workload. The executive module 406 may then update the state flag to indicate that the cache 404 is primed.

In addition, a workload type flag may be set to indicate the type of host workload that is detected. Various types of workloads may be detected, such as random I/O, sequential, and small transfer length sequential workloads. The term "sequential workload" relates to a host workload having one or more requests for data at sequentially related addresses. The term "small transfer length sequential workload" refers to a sequential workload in which less than a page of data is being requested.

Continuing with the example, as more host read requests arrive, a read cache hit may occur, wherein one or more host read requests are satisfied from data that is available in the read cache 404. The cache interface 412 may detect that read cache hit and notify the executive module 406 of the read cache hit. In one implementation of the cache interface 412, a read cache hit indicator is generated in response to detecting the read cache hit. The read cache hit indicator may include information about the nature of the read cache hit, such as, but not limited to, a page address offset indicating a relative address offset of the read cache hit into an associated page, a cache hit size indicating the amount of data retrieved during the cache hit, or a cache address offset indicating the offset of the read cache hit into the cache 404. In one implementation, the executive module 406 transmits the read cache hit indicator to trigger module 410, which may determine that a read cache pre-fetch should be performed.

In an exemplary implementation of the executive module 406, the executive module 406 may receive pre-fetch requests from the priming module 408 and/or the trigger module 410. In this implementation, the pre-fetch requests are passed to the cache interface 412. A pre-fetch request includes pre-fetch information, such as a mass storage memory address from which to fetch data, and a cache memory address at which to store the fetched data. The pre-fetch request may also include an amount indicator specifying the amount of data to fetch. The cache interface 412 may use the pre-fetch information to carry out the requested pre-fetch operation.

With regard to the priming module 408, the priming module 408 employs operation(s) to detect a trigger, such as a sequential workload and prime, or initialize the read cache 404 with data. Methods of detecting sequential workload are discussed herein with reference to FIG. 5. Priming the read cache 404 involves transferring data into the read cache wherein the read cache had no valid data prior to the transfer. Priming the cache may include transferring data from mass storage media, RAM, ROM, or any other memory into the read cache 404. One particular method for priming the cache involves executing a pre-fetch operation, discussed herein.

In another implementation, the executive module 406 initiates a read pre-fetch operation by calling function(s) in the I/O module 402 to fetch data from a mass storage media and calling function(s) in the cache interface 412 to write the fetched data into the read cache 404. Alternatively, the executive module 406 may set up a process or thread that is executed in a background mode, which interacts with the I/O processor 402 and the cache interface 412 to accomplish the pre-fetch. In yet another implementation, the executive module 406 sets an "execute pre-fetch" flag that indicates to the I/O processor 402 and/or the cache interface 412 that a read pre-fetch should execute.

With more specific regard to the trigger module 410, in one implementation, the trigger module 410 determines whether a pre-fetch operation should be initiated in response to detection of a read cache hit. Thus, in one implementation, the trigger module 410 receives the read cache hit indicator from the executive module 406 and triggers a read cache pre-fetch by notifying the executive module 406 that a pre-fetch operation should be performed. The trigger module 410 may analyze state information, such as the state flag, to determine whether the read cache hit warrants a pre-fetch operation.

The trigger module 410 may also analyze the nature of the read cache hit, type of workload, and operational parameters to determine whether to trigger a read cache pre-fetch and the nature of the read cache pre-fetch. In one implementation, the trigger module 410 analyzes the location of the read cache hit in cache memory using the page address offset in the read cache hit indicator generated by the cache interface 412. In one implementation, a read cache pre-fetch is triggered if the read cache hit occurs within a specified portion of the associated page.

For example, the trigger module 410 may be configured to trigger a pre-fetch if the read cache hit is in a head portion of an associated page of data. The head portion may include any data within a predetermined address range at the head of the page, such as, 8 kB. Thus, for example, the trigger module 410 may trigger a pre-fetch operation whenever the first byte of data in a page is retrieved during a read cache hit.

The trigger module may also be configured to trigger the pre-fetch operation if the read cache hit occurs within another portion of the associated page of data, such as, a middle portion, or a last portion. For example, if the trigger module 410 is configured to recognize a read cache hit on a last portion (e.g., the last 4 kB of a page), a read pre-fetch will be triggered if the last byte in a cached page is retrieved during a read cache hit. The size and/or location of the triggering portion within a cached page depends on the particular implementation and may be based on the types of workloads expected. In one implementation, the size and location of the triggering portion is adjustable, either automatically or manually. The size and location of the triggering portion may be adjusted depending on a number of parameters, such as disk drive latencies, or workload type.

The trigger module 410 may specify parameters of a pre-fetch operation, based on parameters, such as workload type or operational parameters. In a particular implementation, if a small transfer length sequential workload has been detected, the trigger module 410 specifies a pre-fetch size and location only out to the end of a page in the address space. For example, if the host is requesting 2 kB blocks of data in the small transfer length sequential workload, and the page size is 64 kB, the trigger module 410 will specify a pre-fetch up to the next 64 kB boundary; i.e., to the end of the page. Pre-fetching to the end of the page may amount to, for example, 32 kB. If the host continues to request sequential 2 kB blocks, corresponding read cache hits will continue to occur. Eventually, a read cache hit may occur at a tail portion (i.e., the end) of the page that was originally cached. The trigger module 410 may then trigger page sized pre-fetches. Thus, the trigger module 410 may transition from pre-fetches that are smaller than a page to pre-fetches that are at least a page.

With more specific reference to the cache interface 412, in one implementation, the cache interface 412 is operable to carry various functions related to read data from and writing data to the read cache 404. In a particular implementation, the cache interface 412 is operable to carry out pre-fetch operations. In this implementation, the cache interface 412 may interface with the I/O processor 402 to rapidly read data from mass storage media and write the data to read cache 404. The cache interface may also be operable to transfer data from the read cache 404 to the I/O processor 402 during a read cache hit.

With regard to the read cache 404, the read cache 404 may be an entire read cache or only a portion of the read cache. In addition, the read cache 404 may be partitioned into one or more memory sections, such as pages having page boundaries.

The various modules illustrated in FIG. 4 may be implemented in any combination of software, hardware, or firmware. In addition, the exemplary modules, processes, and functions may be combined and/or separated in any way as is suitable to the implementation whereby the substantial utility of the system is still achieved.

Figure 5:
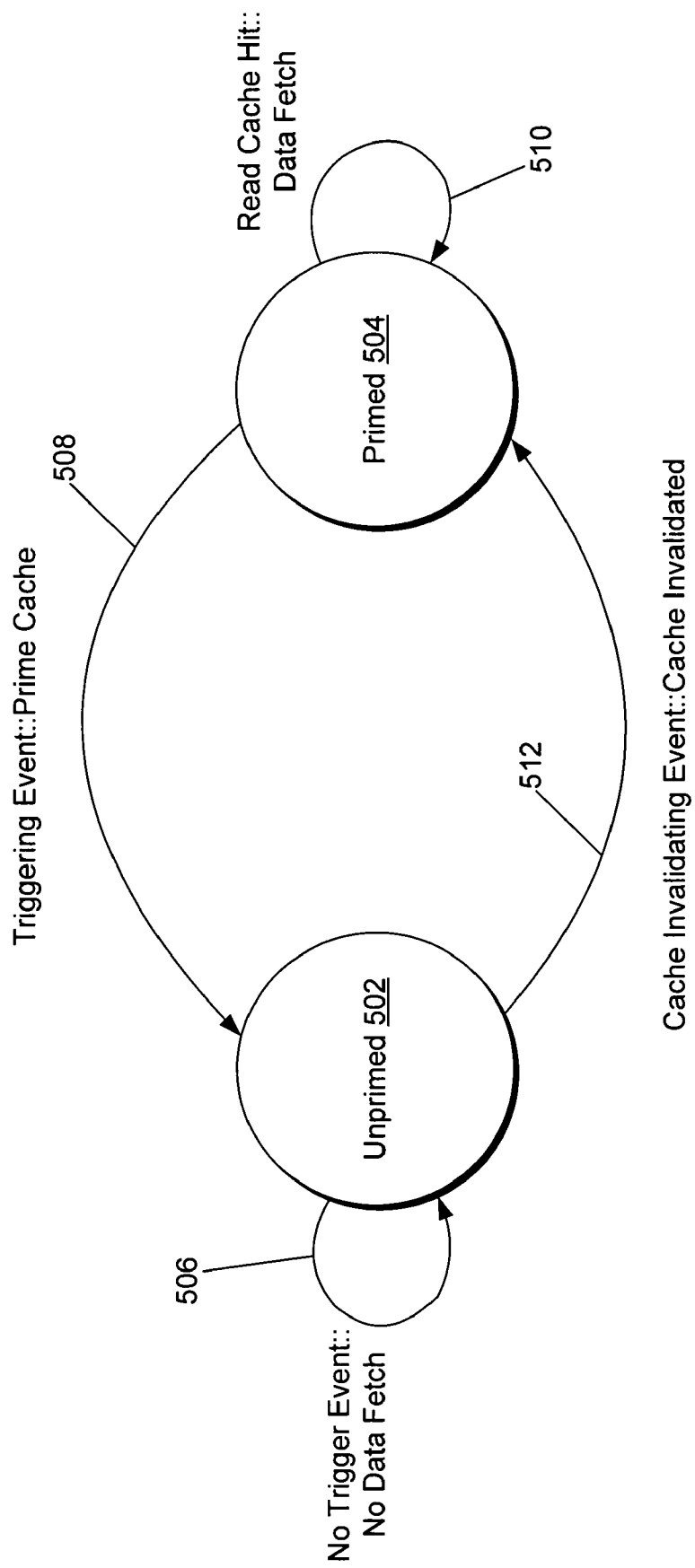
FIG. 5 is a state diagram having exemplary states and transition criteria that may be employed by the pre-fetch manager shown in FIG. 4.

FIG. 5 is a state diagram having exemplary states and transition criteria that may be employed by the pre-fetch manager 400 shown in FIG. 4. As discussed above, in one implementation of the pre-fetch manager 400, the executive module 406 monitors state information and transitions from various system states. Two exemplary states are shown in FIG. 5: an unprimed state 502 and a primed state 504.

In the particular implementation shown in FIG. 5, the unprimed state 502 is a system state in which data in a read cache (for example, the read cache 404, FIG. 4) is invalid and/or unavailable for satisfying a read request. The unprimed state 502 is typically the initial system state, as, for example, upon system power-up, there may be no data in the cache, or the data is unknown or the cache is cleared. Upon entry into the unprimed state 502 a state flag (not shown) may be initialized or updated in memory to indicate that the system (for example, the storage device 202, FIG. 2 or the storage device 302, FIG. 3) is in the unprimed state 502.

In the unprimed state 502, any number of inputs may be received and analyzed (for example, by the priming module 408, FIG. 4) to determine a triggering event that may cause the system to transition to another state, such as the primed state 504. Inputs into the unprimed state 502 include, but are not limited to, system operation data, such as workload data, usage data, and mass storage device parameters. Using the inputs, operation(s) in the unprimed state 502 attempt to detect a priming event. In one implementation, the unprimed state 502 includes operations that analyze host requests to determine whether a triggering event occurs.

One type of triggering event is a sequential workload. Thus, for example, a sequential workload detection operation in the unprimed state 502 may attempt to determine whether a series of host read requests suggest a sequential workload, wherein data is being read from substantially sequential addresses. The exemplary sequential workload detection operation of the unprimed state 502 may use any pattern recognition algorithm as may be known to detect a sequential workload. A particular algorithm involves sorting received request addresses and determining whether the addresses are substantially sequential; that is, determine whether the requested addresses have a recognizable order or other pattern to them. Other algorithms may be known in the art that may be readily applicable to the unprimed state 502 for detecting a priming event, such as a sequential workload.

In an implementation of the unprimed state 502, if no triggering event is detected, a reentry path 506 is taken. The reentry path 506 essentially keeps system in the unprimed state 502. In one implementation, operations executing during the unprimed state 506 simply continue attempting to detect the priming event. For example, if the priming event is a sequential workload, the sequential workload detection operation may continue to attempt to detect a sequential pattern in received addresses. Reentering 506 the unprimed state 502 may involve updating the state flag (not shown) used to keep track of the state to indicate that the current state is the unprimed state 502.

Any event suitable to the implementation may be considered a triggering event, wherein if the event occurs, the read cache will be primed. Priming the read cache involves storing initial data into the read cache. The initial data is then available for satisfying a read request from the read cache. In some implementations, the initial data may be stored in the read cache to be used for other purposes besides satisfying a host read request. For example, in one implementation, the read cache is used for internal system information, such as virtual maps. In such an implementation, the virtual map data may be retrieved from the mass media to prime the cache and result in a sequential workload. If a triggering event is detected in the unprimed state 502, a state transition 508 is made, wherein the system transitions to the primed state 504. In one implementation, the state transition 508 may involve updating the state flag to indicate that the state is the primed state 504.

Detection of the triggering event may cause a cache priming operation. Priming the cache may involve executing a fetching operation, wherein data is stored in the read cache. In one implementation, the fetching operation reads data from the mass storage media (for example, the disk(s) 240, FIG. 2, or disk drive(s) 340, FIG. 3). If the priming event is detection of a sequential workload, the fetched data may be pre-fetched from addresses that are sequentially related to previously received request addresses in preparation for future read requests. Thus, the data that is fetched and stored in the read cache may later be retrieved from the read cache. Retrieving data from the read cache is referred to as a read cache hit, and is discussed in more detail below. The fetching operation may occur before, during, or after the transition 508 from the unprimed state to the primed state 504.

The primed state 504 is a system state in which the read cache has valid data. The data in the read cache in the primed state 504 may be used to service a read request. Servicing a read request with data in the read cache is one type of read cache hit. Trigger operation(s) execute in the primed state 504 (for example, by the trigger module 410, FIG. 4) to attempt to detect a trigger event, such as a read cache hit.

A read cache hit may be detected any number of ways. Any retrieval of data from the read cache may be a read cache hit. In one particular implementation, a cache interface (for example, the cache interface 412, FIG. 4) facilitates retrieval of requested data from the read cache and notifies the trigger operation(s) that a read cache hit has occurred. In this implementation, the trigger operation(s) may be notified of the nature of the read cache hit. For example, the size, memory address, page offset, and cache offset may be passed to the trigger operation(s).

If, in the primed state 504, a read cache hit is detected, a reentry path 510 is taken. The reentry path 510 causes the system to reenter the primed state 504. Substantially coincident with reentering the primed state 504 is execution of a fetch operation. The fetch operation fetches data from a memory and stores the data in the read cache. In one particular implementation, a specified amount of data is fetched from a disk or other mass storage media and written to a specified memory location in the read cache. The data that is fetched in the primed state 504 may be sequentially further into the address space of the requested data that caused the read cache hit.

Any amount of data may be fetched in response to a read cache hit. A particular implementation fetches a page of data. As discussed, the read cache may be accessed and/or partitioned on page boundaries. The size of a page of data may be any amount of data suitable to the implementation. In one implementation, the page size is 64 kilobytes (kB), because 64kB is compatible with disk sector size and data block sizes of host read requests.

In the primed state 504, another implementation of the pre-fetch manager fetches less than a page of data in response to a read cache hit. This implementation may be particularly suitable in situations where a small transfer length sequential host workload has been detected. As discussed, a small transfer length sequential host workload is a sequential host workload in which the requests are for less than a page of data.

In yet another implementation, the amount of data that is fetched in the primed state 504 is adjustable, either manually or automatically. The amount of data fetched may be automatically adjusted dynamically during operation in response to variations in operation parameters, such as workload type, and device parameters and/or tolerances, such as data retrieval latencies. For example, the system may include a disk drive that has known delays associated with data retrieval that arise because of, for example, mass media defects that result in data read retries, or because the disk drive is an older model with a slower than average data rate. Under circumstances such as these, the implementation may be designed to recognize various operational or usage scenarios and adjust the fetch size accordingly.

While in the primed state 504, an event may occur in which the read cache is no longer primed. An event that causes the read cache to no longer be primed is referred to as a cache invalidating event. One type of cache invalidating event is a stale data event, in which the data in the read cache is beyond a certain age. The data may also become stale if data written by the host affects a memory address corresponding to the data in the read cache. For example, if the data in the read cache was pre-fetched from LBA 100 of LUN 2, and a host write request attempts to change data at LBA 100 of LUN 2, the data in the read cache may become stale.

Other invalidating events may occur. For example, under certain conditions, while in the primed state 510, read cache may be cleared or erased. The read cache may be cleared or erased, for example, in an error condition. Accordingly, in one implementation, all or a portion of the read cache may be invalidated when one or more logical units (LUN) are inactive for a predetermined period of time. In another implementation, when the system is reset, the read cache is invalidated at start-up.

When a read cache invalidating event is detected, a state transition path 512 is followed to the unprimed state 502. The state flag may be updated to indicate that the state is the unprimed state 502. Another flag, such as a "cache valid" flag, may be updated to indicate that the read cache is invalid. Other initializations may occur upon entry into the unprimed state 502. Upon reentry into the unprimed state 502, operation(s) may resume the process of detecting the triggering event.

It is to be understood that the states and paths illustrated in FIG. 5 do not necessarily imply execution or operation of any particular software, firmware, or hardware. The states and paths are meant for illustrative purposes only to describe operation of an exemplary system. The states may be viewed as abstractions of system operational states. The paths illustrated may be viewed as abstractions of events or conditions that may occur in the system, and do not necessarily imply that a path is actually taken in software, hardware, or firmware.

Figure 6:
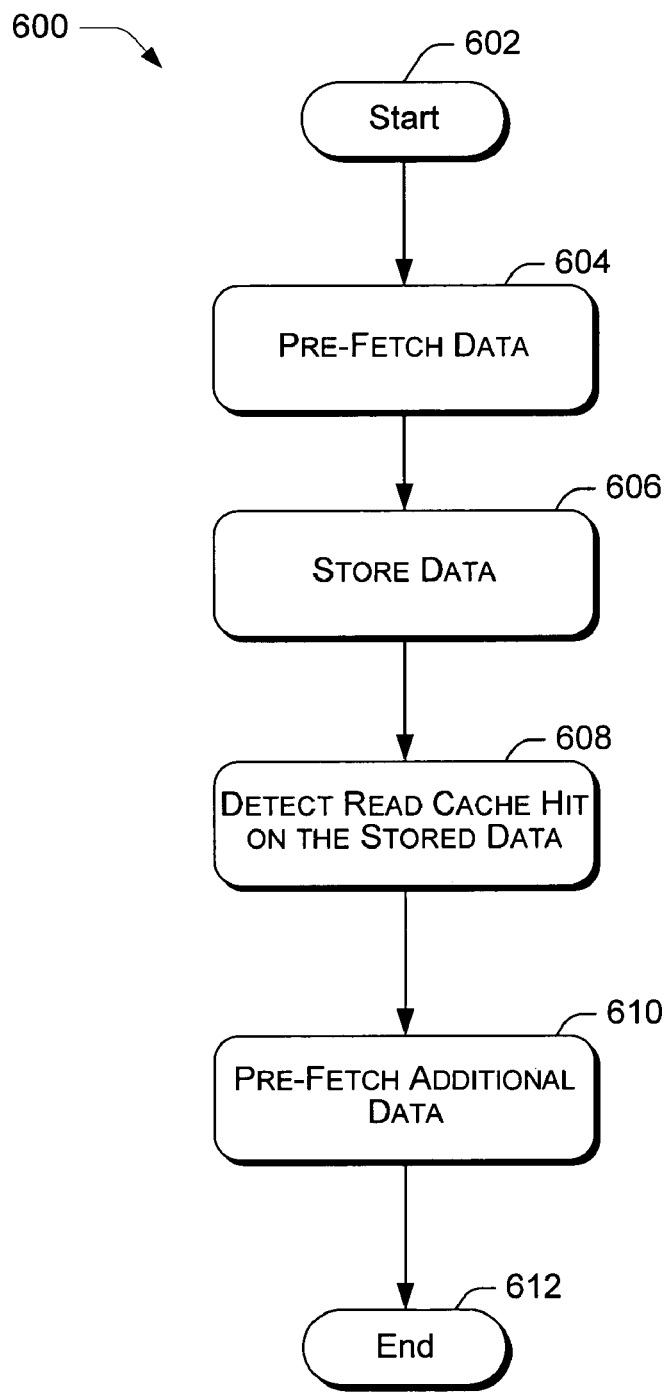
FIG. 6 illustrates an operational flow having exemplary operations that may be executed in the systems of FIGS. 1-4 for triggering a pre-fetch operation.
Figure 7:
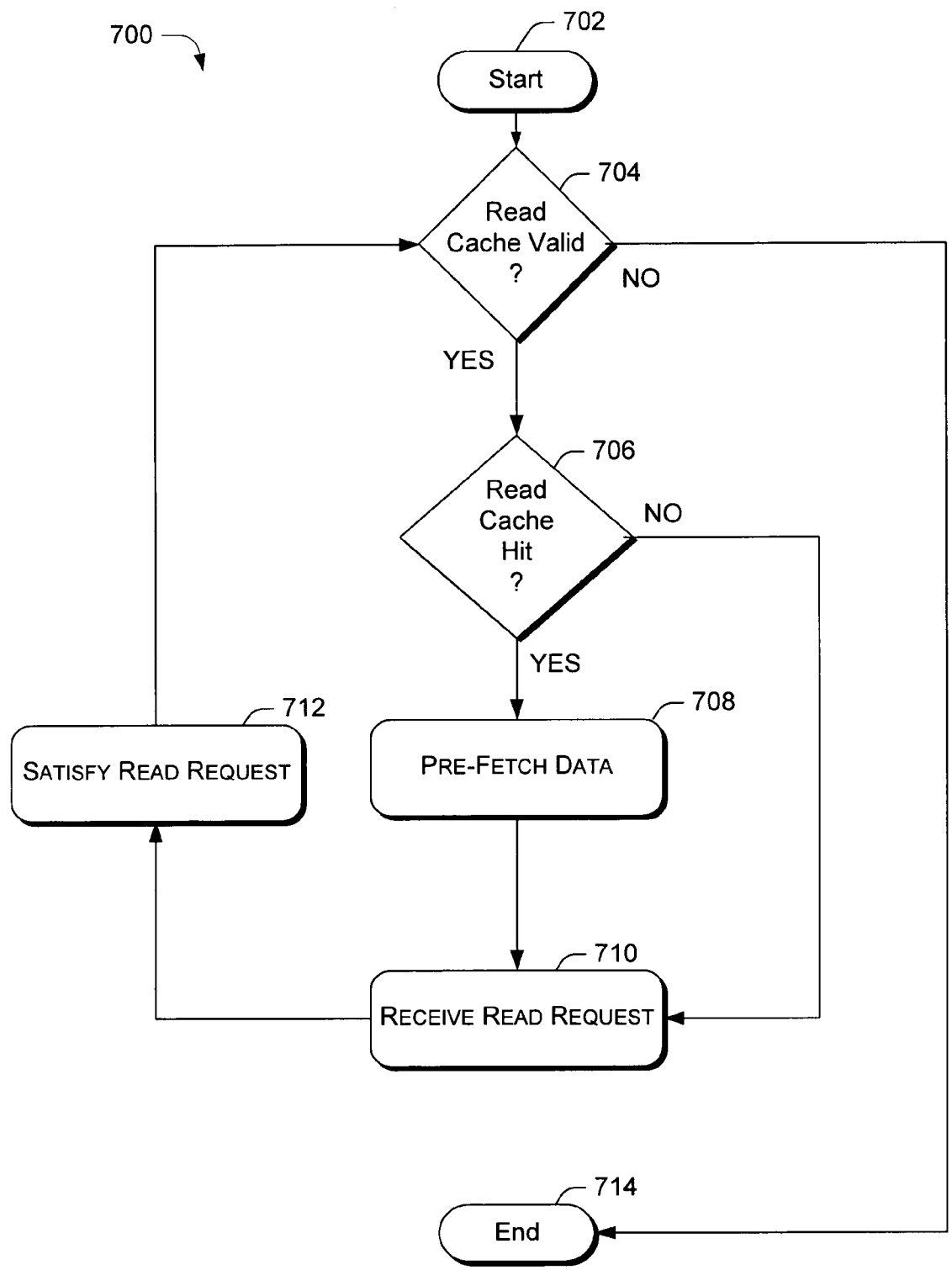
FIG. 7 illustrates an operational flow having exemplary operations that may be executed in the systems of FIGS. 1-4 for triggering a pre-fetch operation.
Figure 8:
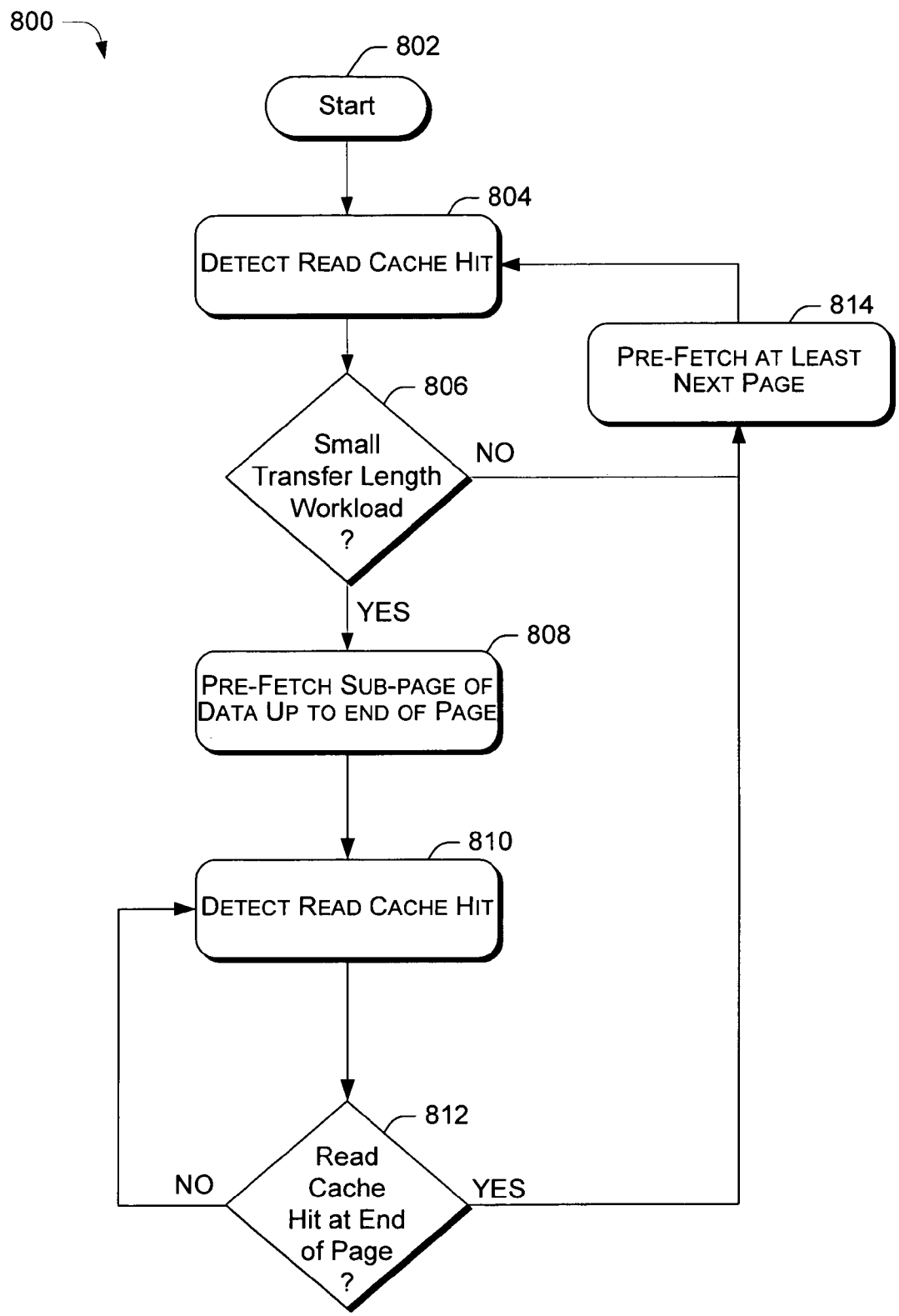
FIG. 8 illustrates another operational flow having exemplary operations that may be executed in the systems of FIGS. 1-4 for triggering a pre-fetch operation in response to reach cache hits.

FIGS. 6, 7 and 8 illustrate operational flows exemplifying various methods related to operations for detecting sequential host workloads. The operations shown in FIGS. 6, 7 and 8 may be implemented (1) as a sequence of microprocessor implemented acts or program modules running on one or more microprocessors and/or (2) as interconnected machine logic circuits or circuit modules. Alternatively, the operations shown in FIGS. 6, 7 and 8 may be implemented by other hardware, software or firmware in the storage device (e.g., 202, FIG. 2; 302 FIG. 3). Accordingly, the operations described may be referred to variously as operations, routines, structural devices, acts, or modules. The implementation of the operations shown in FIGS. 6, 7, and 8 is a matter of choice dependent on performance requirements and/or hardware and software capabilities of the storage device. It will be recognized by one skilled in the art that these operations may be implemented in software, in firmware, in special purpose digital logic, or any combination thereof without deviating from the spirit and scope of the present invention, as recited in the claims attached hereto. As used herein, computer readable medium may be any available medium that can store or embody processor-readable instructions.

FIG. 6 illustrates an operational flow 600 having exemplary operations that may be executed in the systems of FIGS. 1-4 for triggering a pre-fetch operation. In general, the operational flow 600 stores pre-fetched data and pre-fetches additional data in response to the stored data being accessed.

After a start operation 602, a pre-fetch operation 604 pre-fetches data. In one implementation, the pre-fetch operation 604 executes after a sequential host workload is detected. The pre-fetch operation 604 may read or access the data from a first memory, such as a data disk (for example, the disk(s) 240, FIG. 2), or a disk drive (for example, the disk drive(s) 340, FIG. 3). The pre-fetch operation 604 may fetch any amount of data. In one implementation, a 64 kB page is fetched from memory. In another implementation, several pages are fetched. As discussed earlier, a page of data may be any amount of data suitable to the particular implementation. The amount of data that is fetched may depend on one or more factors, such as the rate of sequential host reads, the size of read cache, and the like.

A store operation 606 stores the data that was fetched in the pre-fetch operation 604. In one implementation, the store operation 606 stores the fetched data in a second memory, such as a read cache memory (for example, in the volatile RAM 228, FIG. 2 or the volatile RAM 338, FIG. 3), where it can be accessed relatively quickly when requested by the host. The store operation 606 may store the fetched data on page boundaries in the memory. The store operation 606 may store the fetched data in sequential order relative to other data that resides in the second memory. The store operation 606 might or might not write over previously stored data with the fetched data.

As discussed, after the fetched data is stored in the read cache memory, if any part of the stored data is accessed in the read cache memory, this event is called a read cache hit upon the stored data. A detect operation 608 may detect the read cache hit. In one implementation, the detect operation 608 receives a read cache hit signal indicating that the stored data is being accessed or retrieved from the read cache. The detect operation 608 may also read a read cache hit flag, and/or set the read cache hit flag in response to the read cache hit.

In another implementation, the detect operation 608 is in response to a processor interrupt (for example, an interrupt by or from the microprocessor 224, FIG. 2, or the microprocessor 324, FIG. 3). In this implementation, the detect operation 608 may be an interrupt handler that executes when a read cache hit occurs. The detect operation 608 may also generate and/or store address information related to the address or addresses corresponding to the read cache hit. The address information may include LBA, LUN, RAM addresses, or any other address indicators.

A pre-fetch additional operation 612 fetches more data from the first memory. The data that is pre-fetched in the pre-fetch additional operation 610 may be related to the stored data (in the store operation 606). Thus, the pre-fetch additional data 610 may fetch data that is further into (i.e., higher addresses) the host address space from the first memory from which the first data was fetched. In one implementation, the pre-fetch additional operation 610 is in response to the detect operation 608. In this implementation, the pre-fetch operation 610 may read a read cache hit flag that was set by the detect operation 608 to determine whether to fetch additional data. The pre-fetch additional operation 610 may also determine one or more memory addresses from which to fetch the additional data based on address information from the detect operation 608.

The pre-fetch operation 610 might determine how much additional data to pre-fetch. The determination of how much additional data to pre-fetch may be based on a number of factors, such as how much data was fetched in the pre-fetch operation 604, the address information discussed above, the rate of sequential host reads, the size of read cache, and the like, or any combination of such factors.

In a particular implementation, the pre-fetch additional operation 610 may be triggered by the detect operation 608. In this implementation, the detect operation 608 may launch the pre-fetch additional operation 610 with a procedure call. Alternatively, the detect operation 608 may set up a process or thread that runs the pre-fetch additional operation 610. The operational flow 600 ends at end operation 612.

FIG. 7 illustrates an operational flow 700 having exemplary operations that may be executed in the systems of FIGS. 1-4 where such systems are capable of triggering a read cache pre-fetch in response to a read cache hit. For example, the operation flow 700 may be implemented in one or more modules of the pre-fetch manager 400 of FIG. 4. In general, the operational flow 700 iteratively checks for a read cache hit, and executes a pre-fetch operation if a read cache hit is detected.

After a start operation 702, a first query operation 704 determines whether a read cache is valid (for example, the read cache 404, FIG. 4). In one implementation, a read cache valid indicator is checked in the query operation 704. In this implementation, the read cache valid indicator is updated by another process when the read cache becomes invalid. As discussed above, the read cache may be invalidated if the read cache data becomes stale, erroneous, cleared, and the like.

If the first query operation 704 determines that the read cache is valid, the operation flow branches "YES" to a second query operation 706. In the second query operation 706 it is determined whether a read cache hit has occurred. In one implementation, the second query operation 706 checks a read cache hit indicator. If a read cache hit has occurred, the second query operation 706 may further check if the read cache hit occurred at a specified location in the cache or a page in the cache.

In one implementation of the second query operation 706, the specified location is within a predetermined offset or address range in a page of the read cache. For example, the query operation 706 may check if the read cache hit occurred in a head portion of the page, wherein the head portion includes the sequentially first 2 kB of addresses in the page. As another example, the query operation 706 may check if the read cache hit occurred in a tail portion of the page, wherein the tail portion includes the sequentially last 8 kB of addresses in the page.

If the second query operation 706 determines that a read cache hit has occurred and the read cache hit retrieved data at the specified address(es), the operation flow branches "YES" to a pre-fetch data operation 708. The pre-fetch data operation 708 pre-fetches a specified amount of data from a specified memory address and stores the specified amount of data in the read cache at a specified location. Thus, in one implementation, the pre-fetch operation 708 receives a "data amount" parameter, a "fetch from address" parameter, and a "write to address" parameter, as inputs.

In a particular implementation of the pre-fetch operation 708, the data that is pre-fetched is at logical addresses that are sequentially farther into the address range relative to the logical addresses associated with the read cache pre-fetch. By pre-fetching data at logical locations farther beyond recently requested addresses, the pre-fetch operation 708 prepares the read cache for future read cache hits, and may increase the likelihood of such read cache hits.

A receive read request operation 710 receives a read request from a requesting device (for example, the host device 104, FIG. 1; 204, FIG. 2; or 304, FIG. 3). The receive request operation 710 may store the request and/or parse the request into component parts, such as request address and range, or otherwise format the received request. After the receive operation 710, a satisfy operation 712 satisfies the read request. The satisfy operation 712 transfers the requested data to the requesting device.

The satisfy operation 712 may retrieve the requested data from a mass storage media (for example, the disk(s) 240, FIG. 2; disk drive(s) 340, FIG. 3) or the read cache. If the data is retrieved from the read cache, the read cache hit indicator may be set to indicate the read cache hit. If the data is retrieved from the mass storage media, this event is referred to as a read cache miss, and the read cache hit indicator may be set to indicate the miss. The satisfy operation 712 may carry out the actual transfer of the retrieved data to the host in any way as may be known in the art, including transferring the retrieved data via an I/O processor (for example, the I/O processor 222, FIG. 2; FCIO processor 322, FIG. 3).

After the satisfy operation 712, the exemplary operation flow 700 returns to the first query operation 704, where it is again determine whether the read cache includes valid data. In another implementation, the read cache validity check performed by the first query operation 704 may be executed in another operation, or another process or thread on a substantially periodic based, which may be interrupt driven or a task in an operating system. If in the first query operation 704, it is determined that the read cache is invalid, the operation flow 700 branches "NO" to an end operation 714, wherein the operation flow 700 ends.

Referring again to the second query operation 706, if it is determined that a read cache hit has not occurred, the operation flow 700 branches "NO" to the receive read request operation 710. In a particular implementation of the receive read request operation 710, a wait state is entered wherein the operation flow 700 waits for a read request to arrive. In another implementation, the receive read request operation 710 may receive a read request that was previously stored in memory, such as, on a queue.

FIG. 8 illustrates another operational flow 800 having exemplary operations that may be executed in the systems of FIGS. 1-4 for triggering a pre-fetch operation in response to read cache hits. The operation flow 800 is consistent with the state diagram shown in FIG. 5. In general the operational flow 800 determines whether a sequential workload is a small length sequential workload, and executes a pre-fetch operation to pre-fetch a specified amount of data based on the type of sequential workload. It is assumed here that a workload type indicator is maintained, updated as the workload type changes, and is accessible during the operational flow 800.

After a start operation 802, a first detect operation 804 detects a read cache hit. A first query operation 806 then checks the type of workload using the workload type indicator. If the workload type is a small transfer length workload, the operation flow 800 branches "YES" to a pre-fetch sub-page operation 808. The pre-fetch sub-page operation 808 causes a pre-fetch of less than a page of data up to the next sequential page boundary. The term "sub-page" refers to any amount of data that is less than a page. After the pre-fetch sub-page operation 808, a second detect operation 810 again detects another read cache hit.

After the next read cache hit is detected, a second query operation 812 determines whether the next read cache hit (detected in the detecting operation 810) was at a predetermined memory location or offset in an associated cache page. In one implementation, the second query operation 812 determines if the cache hit was within a predefined tail portion (or end portion) of the cache page. If the second query operation 812 determines that the next read cache hit did not occur at the predetermined memory location or offset, the operation flow 800 branches "NO" back to the second detect operation 810. Again the second detect operation 810 may detect another read cache hit.

In one implementation, during a small transfer length sequential workload, the loop including second detect operation 810 and the second query operation 812 may be repeated through a number of iterations as the host device repeatedly requests small transfer lengths. In this implementation, in the second query operation 812 the read cache hit may be determined to be at the predetermined location or offset in the page (for example, the tail portion). When a read cache hit occurs at the predetermined location in the associated cache page, the operational flow 800 branches "YES" from the second query operation 812 to a second pre-fetch operation 814.

The second pre-fetch operation 814 causes a pre-fetch of at least a page of data. In one implementation, the second pre-fetch operation 814 fetches one or more pages of data, ending on a page boundary. As such, the implementation of the operational flow 800 allows for a transition from pre-fetching sub-pages during a small transfer length sequential workload, to pre-fetching pages of data during large (i.e., page or larger) transfer length sequential workloads.

Figure 9:
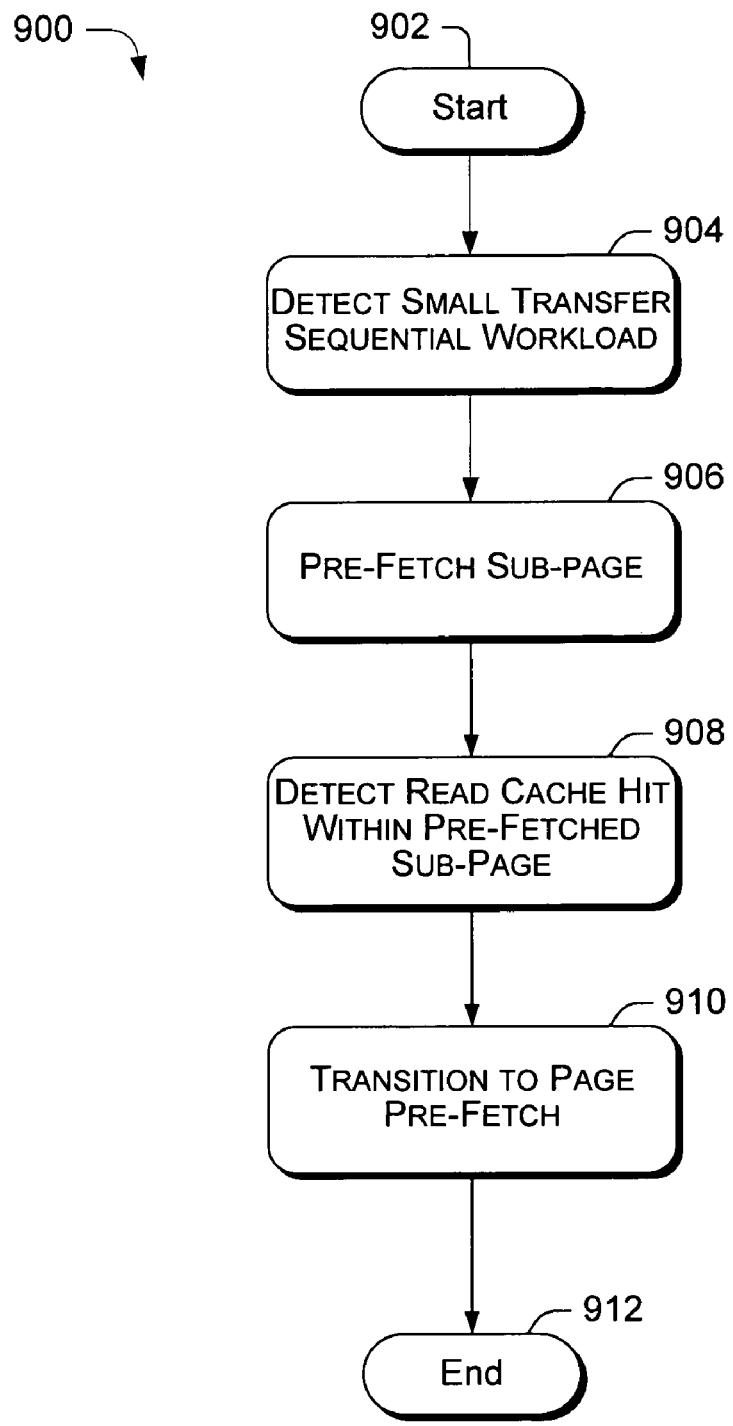
FIG. 9 illustrates another operational flow having exemplary operations for transitioning pre-fetching in response to a small transfer length sequential workload to pre-fetching in response to a large transfer length sequential workload.

FIG. 9 illustrates another operational flow 900 having exemplary operations that may be executed for transitioning pre-fetching in response to a small transfer length sequential workload to pre-fetching in response to a large transfer length sequential workload.

After a start operation 902, a detect operation 904 detects a small transfer length sequential workload. In one implementation, if a series of 2 Kb blocks have been requested from the host, the detect operation 904 detects a small transfer length sequential workload. Upon detecting the small transfer length sequential workload, the detect operation may trigger a pre-fetch sub-page operation 906.

The pre-fetch sub-page operation 906 pre-fetches less than a page of data into the read cache memory in order to satisfy read requests. In one implementation, if the requests include several 2 kB requests in sequential order, the pre-fetch sub-page operation 906 pre-fetches data up to the next page boundary in the host address space. Thus, the sub-page is a remainder of the page of data being requested by the host. After that, the host may continue with 2 kB read requests in sequential order, and the sub-page of pre-fetched data can be used to satisfy the read requests.

A detect read cache hit operation 908 detects a read cache hit at a predetermined location in the pre-fetched sub-page. In one implementation, the detect read cache hit operation 908 detects a read cache hit including 2 kB of data in a middle portion of the sub-page. Other implementations of the detect read cache hit operation 908 may detect read cache hits at different locations within the pre-fetched sub-page.

After detecting a read cache hit at the predetermined location in the pre-fetch sub-page, a transition operation 910 transitions to a page-sized pre-fetch. In one implementation, a large transfer length sequential workload flag is set to indicate that the system has transitioned from a small transfer length sequential workload to a large transfer length sequential workload. Thus, the transition operation 910 causes future pre-fetch operations to pre-fetch at least a page of data in recognition of the fact that the host is requesting pages of data, even though the read request are less than a page in size. The operation flow 900 ends at an end operation 912.

Although the description above uses language that is specific to structural features and/or methodological acts, it is to be understood that the subject matter of the appended claims is not limited to the specific features or acts described. Rather, the specific features and acts are disclosed as exemplary forms of implementation. In addition, the exemplary operations described above are not limited to the particular order of operation described, but rather may be executed in another order or orders and still achieve the same results described.

I claim:

1. A processor-readable medium comprising processor-executable instructions configured for executing a method comprising:
   pre-fetching a sub-page of first data from a mass storage media to a read cache;
   detecting a first read cache hit upon the sub-page in the read cache; and
   pre-fetching a page of second data to the read cache in response to the detecting of the first read cache hit, wherein an amount of the second data is dynamically adjustable in response to variations in an operational parameter.

2. A processor-readable medium as recited in claim 1, wherein the pre-fetching a sub-page comprises fetching a remainder of a page of data.

3. A processor-readable medium as recited in claim 1, further comprising:
   detecting a sequential workload, wherein the pre-fetching a sub-page of first data is in response to detecting the sequential workload.

4. A processor-readable medium as recited in claim 3, wherein the sequential workload comprises a small transfer length sequential workload.

5. A processor-readable medium as recited in claim 1, further comprising:
   detecting a second read cache hit upon the page of second data in the read cache; and
   pre-fetching third data in response to the detecting of the second read cache hit.

6. A processor-readable medium as recited in claim 5, wherein the third data comprises less than a page of data.

7. A processor-readable medium as recited in claim 1, wherein the detecting the first read cache hit comprises:
   retrieving at least a portion of the first data in the read cache.

8. A processor-readable medium as recited in claim 7, wherein in the portion of the first data includes a head portion of the first data.

9. A processor-readable medium as recited in claim 7, wherein the portion of the first data includes a tail portion of the first data.

10. A processor-readable medium as recited in claim 1, wherein the second data is logically sequential to the first data.

11. A processor-readable medium as recited in claim 5, wherein the amount of the second data is adjustable.

12. A processor-readable medium as recited in claim 1, wherein the amount of the second data is manually adjustable.

13. A processor-readable medium as recited in claim 1, wherein the amount of the second data is automatically adjustable.

14. A processor-readable medium as recited in claim 1, wherein the operational parameter comprises at least one of:
 a disk drive data retrieval latency;
 a workload type;
 a tape drive data retrieval latency; and
 a read cache hit size corresponding to the read cache hit.

15. A method comprising:
 detecting a small transfer length sequential workload;
 initiating a first pre-fetch operation to pre-fetch a sub-page into a read cache in response to the sequential workload;
 detecting a first read cache hit on a predetermined portion of the sub-page in the read cache; and
 initiating a second pre-fetch operation in response to the detecting of the first read cache hit, wherein the second pre-fetch operation transitions to page-sized read cache pre-fetching in response to the detecting of the first read cache hit on the predetermined portion of the sub-page.

16. A method as recited in claim 15, wherein the detecting a sequential workload comprises:
 receiving one or more read requests to read data at addresses within a host address space.

17. A method as recited in claim 15, wherein the initiating a first pre-fetch operation comprises:
 pre-fetching first data from a mass storage media and storing the first data into a read cache.

18. A method as recited in claim 17, wherein the initiating of the second pre-fetch operation comprises:
 pre-fetching second data from the mass storage media and storing the second data into the read cache, wherein the second data is logically sequential to the first data.

19. A method as recited in claim 18, further comprising:
 detecting a second read cache hit corresponding to the second data; and
 in response to detecting the second read cache hit, initiating a third pre-fetch operation for third data that is logically sequential to the second data.

20. A method as recited in claim 15, wherein the predetermined portion is a tail portion.

21. A method comprising:
 detecting a small transfer length sequential workload;
 priming a read cache with initial data based on the detected small transfer length sequential workload;
 triggering a read pre-fetch operation in response to a read cache hit upon at least a portion of the initial data in the read cache;
 pre-fetching a sub-page of data;
 storing the pre-fetched sub-page of data in the read cache;
 detecting a read cache hit upon the sub-page of data; and
 transitioning to page pre-fetching wherein subsequent pre-fetch operations pre-fetch at least a page of data.

22. A method as recited in claim 21, wherein the read pre-fetch operation comprises transferring second data from a memory into the read cache and further comprising:
 triggering a second read pre-fetch operation in response to a second read cache hit upon either the initial data in read cache or the second data in read cache.

23. A method as recited in claim 22 wherein the memory is a mass storage medium.

24. A method as recited in claim 22 wherein the memory is random access memory.

25. A method as recited in claim 21 wherein the portion of the initial data is a head portion.

26. A method as recited in claim 21 wherein the portion of the initial data is a tail portion.

27. A method as recited in claim 21 wherein the pre-fetch operation comprises pre-fetching a page of data.

28. A method as recited in claim 21 wherein the pre-fetch operation comprises pre-fetching less than a page of data.

29. A storage device comprising:
 a priming module operable to trigger an initial pre-fetch of initial data from a mass storage medium into a read cache and operable to detect a sequential workload and trigger the initial pre-fetch operation in response to the detection of the sequential workload; and
 a trigger module in operable communication with the priming module, operable to trigger a subsequent pre-fetch of subsequent data from the mass storage medium into the read cache in response to a read cache hit upon the initial data in the read cache, wherein size of the second pre-fetch operation is dynamically adjustable in response to variations in an operational parameter.

30. A storage device as recited in claim 29, wherein the sequential workload is a small transfer length sequential workload.

31. A storage device as recited in claim 29, wherein the subsequent read pre-fetch operation comprises pre-fetching less than a page of data.

32. A storage device as recited in claim 29, further comprising:
 a cache interface in operable communication with the trigger module and the priming module, the cache input/output module operable to pre-fetch data into and read data from the read cache memory; and
 an input/output processor in operable communication with the priming module, the trigger module, and the cache interface, the input/output processor operable to communicate read requests to the trigger module and the priming module.

33. A system comprising:
 a first memory;
 a microprocessor in operable communication with the first memory;
 a read cache in operable communication with the microprocessor;
 means for pre-fetching a sub-page of first data from a mass storage media to the read cache;
 means for detecting a first read cache hit upon the sub-page in the read cache;
 means for pre-fetching a page of second data to the read cache in response to the detecting of the first read cache hit; and
 means for dynamically adjusting an amount of the second data in response to variations in an operational parameter.

34. A system as recited in claim 33, wherein the means for pre-fetching comprises:
 a priming module in operable communication with the read cache, operable to transfer initial data to the read cache; and
 a trigger module in operable communication with the read cache, operable to transfer subsequent data to the read cache in response to the read cache hit.

35. A system as recited in claim 33, wherein the first memory is a disk drive.

36. A system as recited in claim 33, wherein the first memory is a Redundant Array of Independent Disks (RAID).

37. A system as recited in claim 36, wherein the RAID comprises at least one of:
- magnetic disks;
- tapes;
- optical disks; or
- solid state disks.

38. A method of triggering a read cache pre-fetch comprising:
- detecting a small transfer length sequential workload;
- pre-fetching a sub-page of data into a read cache in response to detecting the small transfer length sequential workload;
- detecting a read cache hit at a predetermined location in the sub-page of data in the read cache;
- transitioning to page-size pre-fetching in response to detecting the read cache hit at the predetermined location in the sub-page; and
- dynamically adjusting size of the page-size pre-fetching in response to variations in an operational parameter.

39. A method as recited in claim 38, wherein the pre-fetching a sub-page of data into a read cache comprises:
- pre-fetching data up to a next page boundary in a host address space.

40. A method as recited in claim 38, wherein the predetermined location includes a head portion of the sub-page in the read cache.

41. A method as recited in claim 38 further comprising:
- pre-fetching a page of data into the read cache in response to detecting the read cache hit at the predetermined location in the sub-page of data in the read cache.

42. A method as recited in claim 38 further comprising:
- pre-fetching a plurality of pages of data into the read cache in response to detecting the read cache hit at the predetermined location in the sub-page of data in the read cache.

* * * * *

UNITED STATES PATENT AND TRADEMARK OFFICE
CERTIFICATE OF CORRECTION

PATENT NO. : 7,493,450 B2  Page 1 of 1
APPLICATION NO. : 10/414194
DATED : February 17, 2009
INVENTOR(S) : Brian S. Bearden It is certified that error appears in the above-identified patent and that said Letters Patent is hereby corrected as shown below:

In column 21, line 1, in Claim 11, delete "claim 5," and insert -- claim 1, --, therefor.

In column 21, line 58, in Claim 22, delete "claim 21," and insert -- claim 21 --, therefor.

Signed and Sealed this

Thirteenth Day of July, 2010

David J. Kappos
*Director of the United States Patent and Trademark Office*